United States Patent
Kiel et al.

(10) Patent No.: US 7,585,209 B2
(45) Date of Patent: Sep. 8, 2009

(54) AIR-CONDITIONING DEVICE FOR VEHICLES AND METHOD FOR THE OPERATION OF AN AIR-CONDITIONING DEVICE

(75) Inventors: Ronny Kiel, Leinfelden-Oberaichen (DE); Thorsten Möllert, Stuttgart (DE); Stéphanie Larpent, Stuttgart (DE)

(73) Assignee: BEHR GmbH & Co. KG, Stuttgart (DE)

( * ) Notice: Subject to any disclaimer, the term of this patent is extended or adjusted under 35 U.S.C. 154(b) by 344 days.

(21) Appl. No.: 10/562,920

(22) PCT Filed: Jun. 18, 2004

(86) PCT No.: PCT/EP2004/006636
§ 371 (c)(1),
(2), (4) Date: Jul. 10, 2006

(87) PCT Pub. No.: WO2005/000613
PCT Pub. Date: Jan. 6, 2005

(65) Prior Publication Data
US 2007/0042699 A1 Feb. 22, 2007

(30) Foreign Application Priority Data
Jun. 30, 2003 (DE) .............................. 103 29 582

(51) Int. Cl.
*B60H 1/00* (2006.01)
*B06H 1/32* (2006.01)
(52) U.S. Cl. ....................................... 454/143; 62/244

(58) Field of Classification Search ................. 454/143, 454/160; 165/202–203
See application file for complete search history.

(56) References Cited

U.S. PATENT DOCUMENTS

| 4,545,526 | A | 10/1985 | Ido et al. |
| 6,351,961 | B1 * | 3/2002 | Kurokawa et al. ............ 62/244 |
| 6,439,296 | B1 | 8/2002 | Arold et al. |
| 6,814,137 | B2 * | 11/2004 | Tsurushima et al. ........ 165/202 |
| 6,904,763 | B2 * | 6/2005 | Araki et al. ................... 62/244 |

FOREIGN PATENT DOCUMENTS

| DE | 33 44 562 C2 | 6/1985 |
| DE | 195 01 593 A1 | 7/1995 |
| DE | 44 15 459 A1 | 11/1995 |
| DE | 100 16 085 A1 | 10/2000 |

(Continued)

OTHER PUBLICATIONS

English translation of Abstract, FR 2737156.*

*Primary Examiner*—Steve McAllister
*Assistant Examiner*—Helena Kosanovic
(74) *Attorney, Agent, or Firm*—Foley & Lardner LLP

(57) ABSTRACT

The invention relates to an air-conditioning device and to a method for the operation of an air-conditioning device. The aim of the invention is to improve current air-conditioning devices such that a desired level of temperature inside the motor vehicle changes as little as possible and the windows are kept mist-free. As a result, each bypass channel, which guides the heat exchanger to an air outlet channel, is associated with a mixing flap in order to control the warm air flow passing through the bypass channel.

18 Claims, 7 Drawing Sheets

FOREIGN PATENT DOCUMENTS

| | | |
|---|---|---|
| DE | 199 22 324 C1 | 10/2000 |
| FR | 2 710 878 A1 | 4/1995 |
| FR | 2 737 156 A1 | 1/1997 |
| FR | 2 765 526 A2 | 1/1999 |
| JP | 11-048747 A | 2/1999 |
| WO | WO 01/08911 A1 | 2/2001 |

* cited by examiner

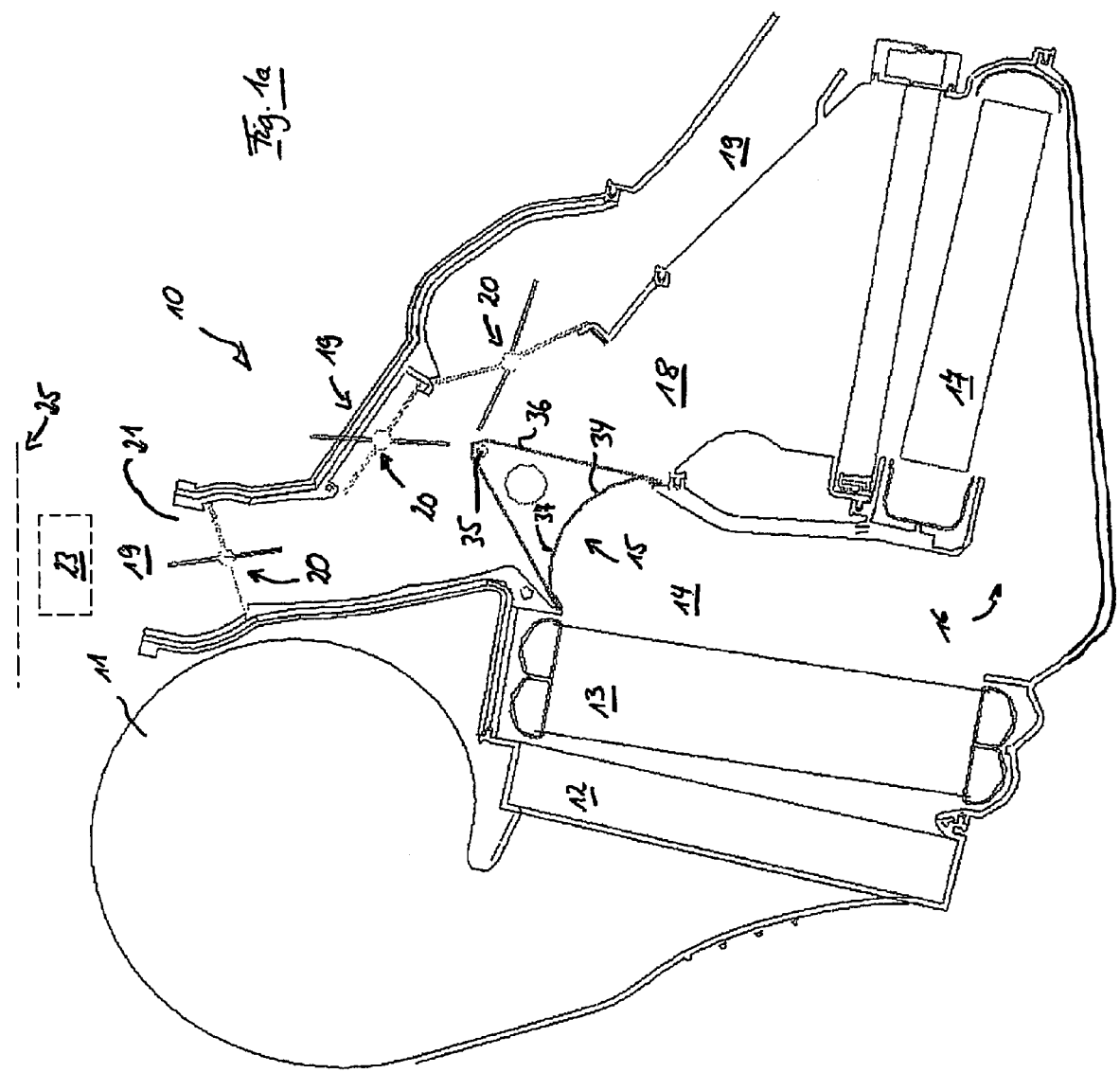

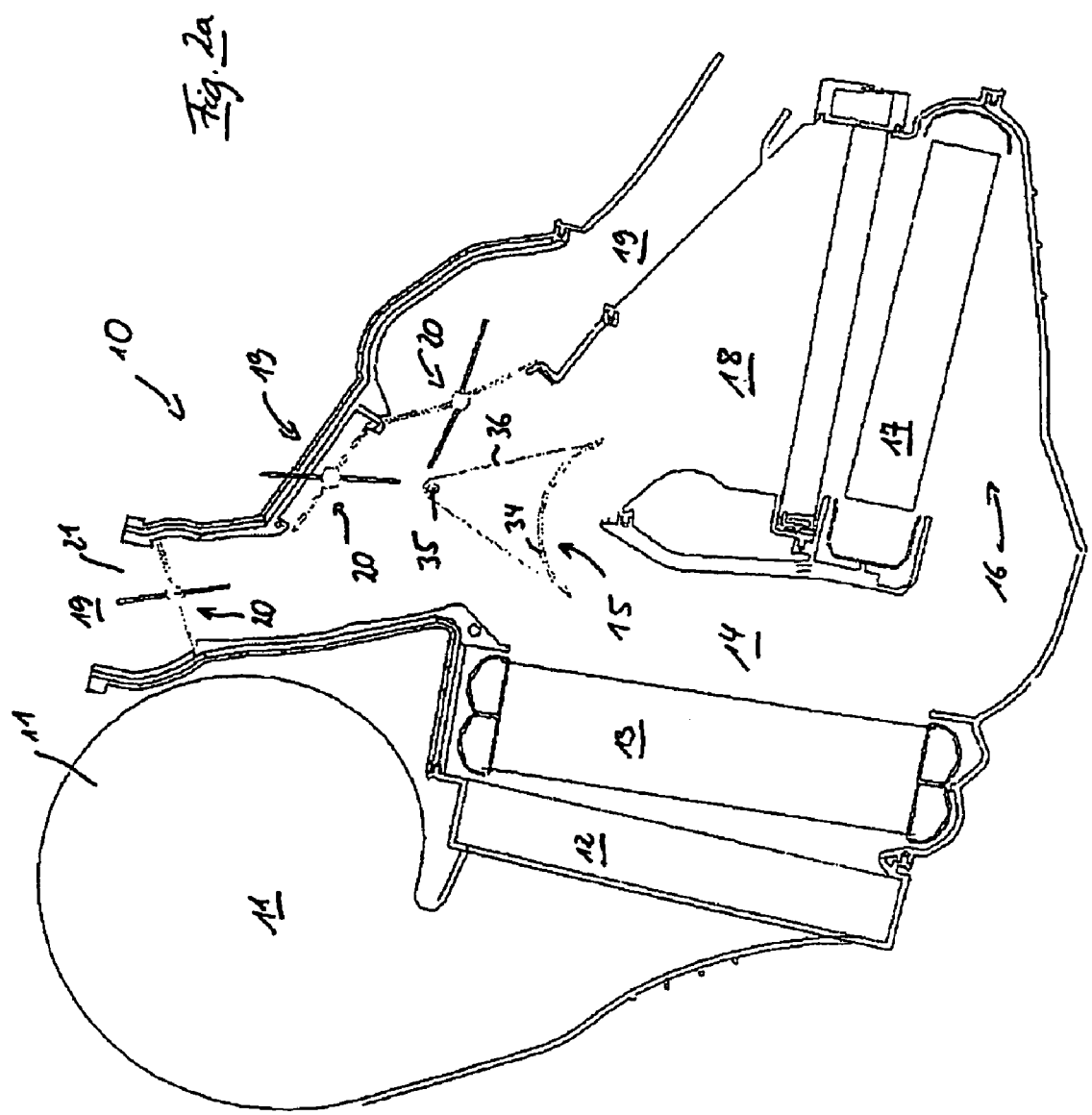

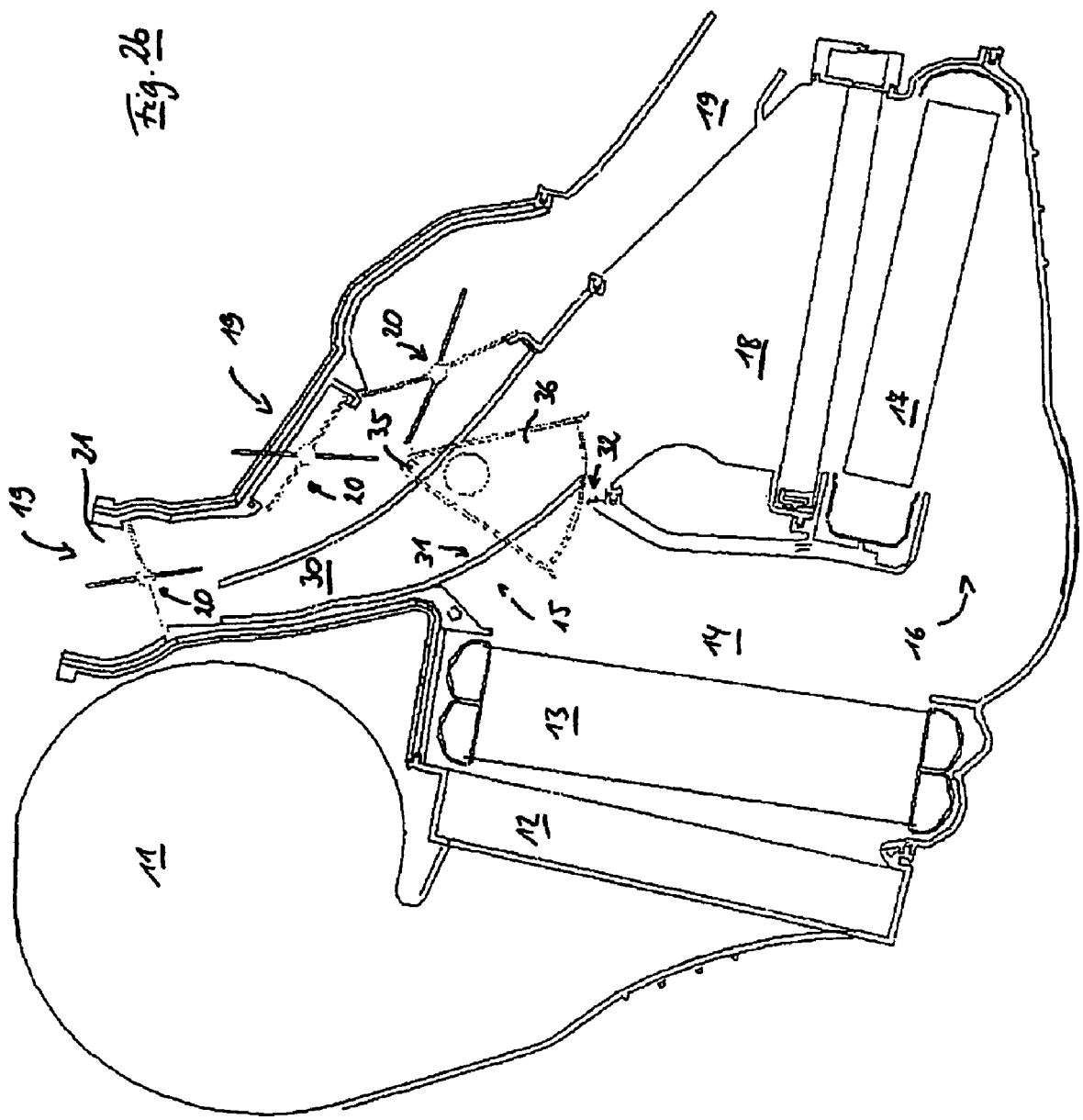

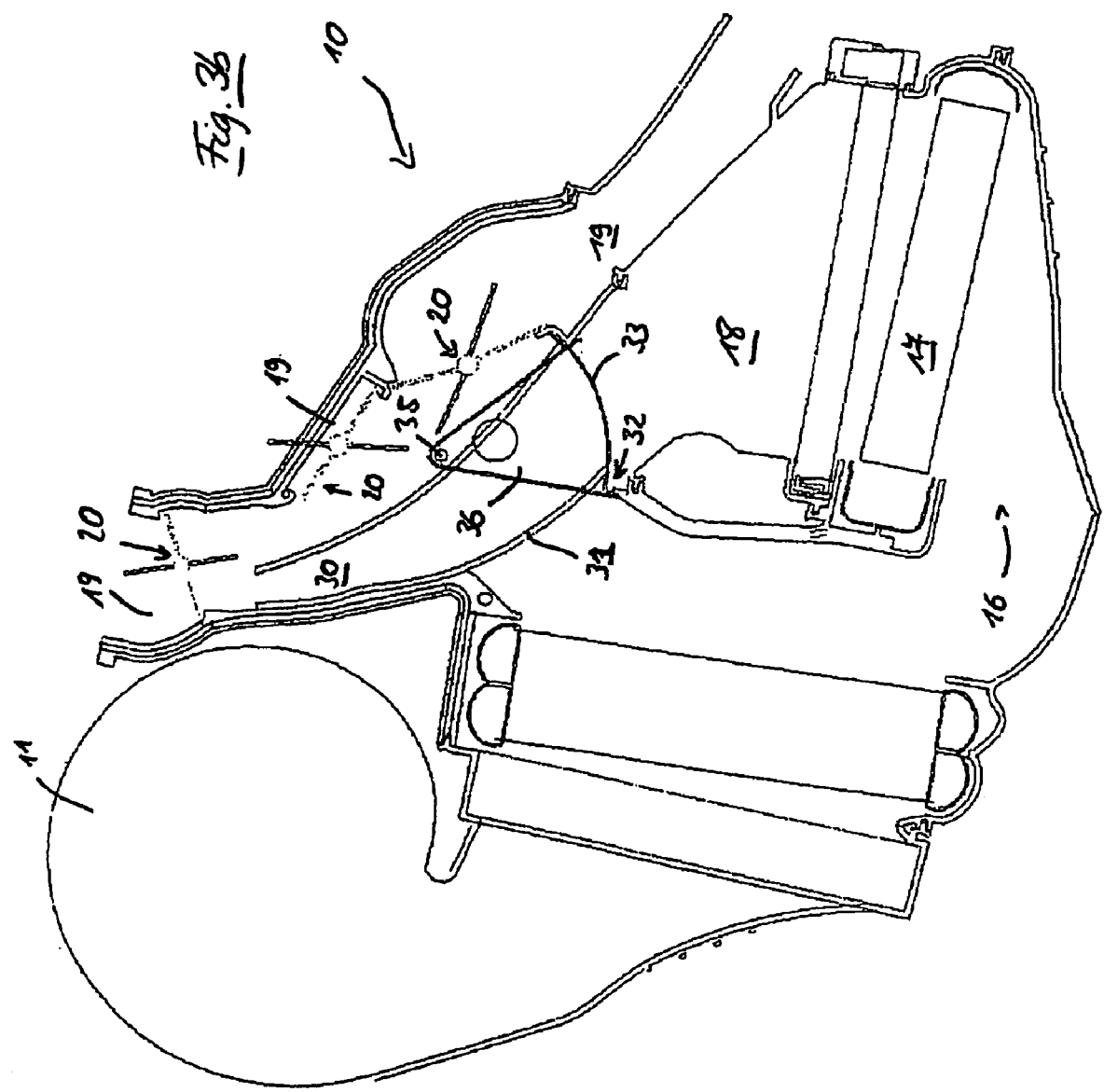

AIR-CONDITIONING DEVICE FOR VEHICLES AND METHOD FOR THE OPERATION OF AN AIR-CONDITIONING DEVICE

BACKGROUND

The present invention relates to an air-conditioning device and to a method for operating an air-conditioning device.

Air-conditioning devices which form the basis of the generic type are known in vehicles. The purpose of air-conditioning devices is to generate and maintain a temperature stratification which is considered favorable in the interior of the vehicle and at the same time to allow the vehicle to be driven safely with respect to traffic. The air stratification that is to be generated is to be selected in such a way in terms of the temperature profile that the region surrounding the heads of the vehicle occupants is at lower temperatures than the space surrounding their feet. On the other hand, to prevent fogging in particular of the front windshield for the driver, it is desirable for the inner side of the windshield to be exposed to an air stream which is warmer in relative terms, since this air stream heats the side of the windshield on the inside of the vehicle and at the same time is able to take up a greater level of moisture. As a result, the precipitation of moisture on the inside of the windshield is prevented or very quickly cleared. Tendency to fogging may in this context occur in particular in the control region of the air-conditioning system, i.e. in the event of only a minor deviation from the control stipulations.

To achieve temperature stratification of this nature and at the same time to achieve a warm air stream in the region of the front windshield, it is known to provide a bypass passage, which branches off downstream of the heat exchanger and passes an air stream which has been heated in this way into the defrosting passage, bypassing a mixing chamber which mixes the warm partial air stream with the cold partial air stream, to be provided in an air-conditioning device. The defrosting passage is used to feed an air stream into the defrosting nozzles assigned to a vehicle windshield. The mixing chamber per se is configured in such a way that although the two partial air streams are mixed in it, there are regions in which there is a higher proportion of the cold air stream, while in other regions the proportion of the warm air stream is higher. Nevertheless, different mixed air temperatures in the air exit passages are possible depending on the region in which the air exit passages which ventilate the vehicle interior branch off, allowing the generation of temperature stratification in the vehicle interior. Air exit passages which open out further up within the vehicle in this case have lower mixed air temperatures than those which open out in the foot well.

Air-conditioning devices of this type have the drawback that a constant warm air stream is passed continuously via the bypass passage to the defrosting nozzles; this warm air stream has an air fraction which has been branched off directly downstream of the heat exchanger and is therefore at a high temperature. This air stream which is guided upward along the vehicle window, however, counteracts a temperature stratification that is to be generated in the vehicle and provides for a lower air temperature in the region of the heads of the vehicle occupants.

This drawback manifests itself in particular if the air flow which is passed through the defrosting nozzles is low, i.e. the defrosting function is switched off, and there is also no need for a large volumetric flow to generate the desired temperature stratification in the interior of the vehicle. In this case, the proportion of the warm air stream in terms of the total air stream in the defrosting passage is high and substantially determines the temperature of this total air stream. A warm air stream then emerges from the defrosting nozzles at a temperature higher than necessary to reliably generate fog-free windows, and this counteracts cooling of the interior of the vehicle and disrupts the desired temperature stratification in the vehicle interior.

SUMMARY

It is an object of the invention to improve air-conditioning devices based on the generic type in such a way that a desired temperature stratification in the interior of the vehicle is disrupted as little as possible by the need to maintain fog-free windows.

Working on the basis of an air-conditioning device of the generic type, this object is achieved according to the invention by an air-conditioning device according to the invention.

An air-conditioning device has a fan for generating an air stream. An evaporator is arranged downstream of this fan and is adjoined by a distributor space, in which the air stream can be divided by means of control flaps between a first flow passage and a second flow passage, so that it is possible to generate a first partial air stream and a second partial air stream. The first flow passage opens out into a mixing chamber, while a heat exchanger for heating the second partial air stream is arranged in the second flow passage and the second flow passage only opens out in the mixing chamber downstream of the heat exchanger.

It is possible to generate a mixed air stream from the first and second partial air streams in the mixing chamber, air exit passages leading from the mixing chamber into different regions of the vehicle interior. Switching flaps, which control the air exit stream from the mixing chamber through the associated air exit passage, are assigned to the air exit passages on the mixing chamber side. At least one of the air exit passages is a defrosting passage, which is used to generate an air stream directly along the inner side of a vehicle window of the vehicle and opens out at a defrosting nozzle assigned to the vehicle window. A defrosting passage is assigned at least one bypass passage, which branches off downstream of the heat exchanger, starting from the second flow passage upstream of the mixing chamber, opens out directly into the defrosting passage and through which a warm air stream can flow.

According to the invention, it is provided that each bypass passage is assigned a mixing flap for controlling the warm air stream through the bypass passage.

The result of this measure is that the volumetric flow of warm air through the bypass passage can be controlled. Therefore, the proportion of the air flow through the defrosting nozzle, which originates from the bypass passage, can be adapted to the operating state of the air-conditioning system. This makes it possible to increase the air flow through the defrosting passage compared to the air flow which emerges through the nozzles flowing into the upper region of the vehicle interior, while at the same time this increased temperature does not unnecessarily counteract the generation of the desired temperature stratification in the vehicle interior.

According to an advantageous configuration of the invention, the position of the mixing flap is coupled to the position of the control flaps which divide the air stream into the first and second partial air streams. This coupling continuously generates a suitable ratio of the air flow in the bypass passage to the air flow in the defrosting passage which comes from the mixing chamber. This ratio is coupled to the temperature mixing of warm air and cold air in the mixing chamber and therefore the temperature in the air exit passages. At the same time, it is not necessary to record additional measurement variables and process them in a control unit in order to determine a desired position of the mixing flap. This, without restricting the functionality, reduces the additional outlay and costs associated with the installation of a mixing flap.

It corresponds to a further advantageous configuration for the mixing flap and control flaps to be arranged on one common pivot axle. This measure reduces the structural outlay required for the additional provision of a mixing flap in addition to the control flaps, in particular the number of passages through walls, which may also cause problems with regard to the generation of noise in the air-conditioning device and therefore require particular attention.

According to an advantageous configuration of the invention, the at least one mixing flap and the control flaps are driven by means of a common actuator. This measure also has the effect of reducing the additional outlay associated with the installation of the mixing flap.

According to another advantageous configuration of the invention, the mixing flap and control flaps are driven by means of a common actuator, with a gear mechanism being arranged between the mixing flap and control flaps, in such a manner that the angular movement of the mixing flap is in a fixed ratio to the angular movement of the control flaps. This measure makes it possible to couple the movement of the at least one mixing flap to the movement of the control flaps without the actuating displacement of the two necessarily being equal. It is possible in particular to adapt to the throughflow and dimensions of the at least one bypass passage in which the mixing flap is arranged. This allows a high degree of flexibility in the configuration and dimensioning of bypass passage and associated mixing flap without a separate actuator for mixing flaps simultaneously being required.

According to an advantageous configuration of the invention, the first flow passage is designed as an overflow passage with respect to the second flow passage, it being possible to define the ratio between the first partial air stream and the second partial air stream by means of the control flaps arranged in the region of the beginning of the first and second flow passages. In this case, according to the advantageous refinement, each bypass passage runs in such a way that it passes through the first flow passage, the first flow passage having the bypass passage passing through it in particular in the region of the control flaps. This arrangement in particular makes it possible for the mixing flaps and the control flaps to be arranged directly adjacent to one another. This is of benefit in particular if the control flap and mixing flap are arranged on one common pivot axle and/or are driven by means of a common actuator.

According to another advantageous configuration of the invention, the mixing flap and control flap are arranged on a common pivot axle, with the mixing flap extending within regions in which the bypass passage runs, while the control flap is formed in the other regions. This corresponds to the desire for an inexpensive structural configuration of the air-conditioning device. According to a further advantageous configuration, it is possible for the flaps to extend in the axial direction of the common pivot axle and to be curved in cross section with respect thereto. The surface curvature of the control flaps and at least one mixing flap advantageously allows structural properties of the configuration of the flaps to be combined with a simultaneously improved routing of the air stream and position or orientation of sealing surfaces. In this case, according to an advantageous configuration, the flaps are articulatively mounted on the pivot axle by means of pivot arms which widen out in the shape of a segment of a circle and are preferably also arranged at the edge. Another advantageous refinement provides for the flaps which serve as mixing flap and are assigned to a bypass passage to be curved convexly. The flaps which serve as control flap and are used to divide the air stream into first and second partial air streams may according to configurations of the invention be curved concavely.

A method according to the invention for operating an air-conditioning device, in particular according to the invention, of a vehicle, provides that the air stream which flows within a bypass passage is controlled by means of an air flap, the bypass passage being arranged in a flow passage. According to an advantageous configuration, the position of the air flap of a bypass passage is coupled to the position of the control flaps which divide the air stream into first and second partial air streams, this coupling in particular being mechanical in form, and the actuating movement being advantageously effected by means of a common actuator.

BRIEF DESCRIPTION OF THE DRAWINGS

Moreover, the invention is explained in more detail below on the basis of the exemplary embodiment illustrated in the drawings, in which:

FIGS. 1a, 1b show cross-sectional illustrations through an air-conditioning device according to the invention in the region next to a bypass passage and in the region of the bypass passage with the first flow passage closed by control flaps;

FIGS. 2a, 2b show cross-sectional illustrations through an air-conditioning device according to the invention in the region next to a bypass passage and in the region of the bypass passage with the first flow passage partially opened by control flaps;

FIGS. 3a, 3b show cross-sectional illustrations through an air-conditioning device according to the invention in the region next to a bypass passage and in the region of the bypass passage with the second flow passage closed by control flaps;

DETAILED DESCRIPTION

Figure 16:
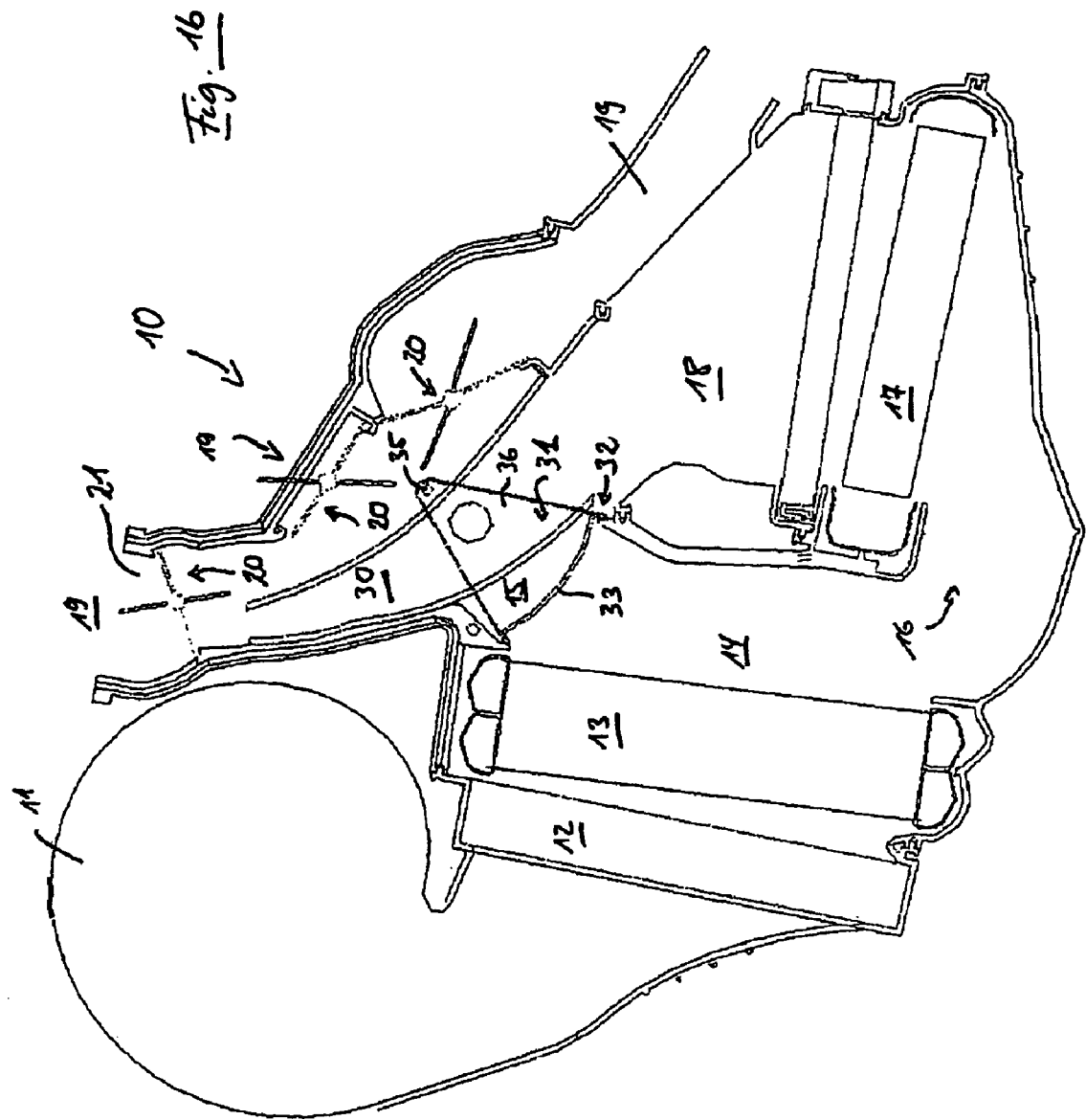

The three pairs of figures, i.e. FIGS. 1a, 1b; 2a, 2b; 3a, 3b, each show a sectional illustration through an air-conditioning device according to the invention. The figures denoted by a in each case show a section through the region outside a bypass passage, while the figures denoted by b show the section in the region of the bypass passage, with the flap position in the same figures corresponding to one another. The position of the bypass passage in the air-conditioning device is arbitrary. It is also possible to provide more than one bypass passage, in which case each bypass passage has a mixing flap. The bypass passage may in particular be formed on one or both sides of the air-conditioning device or in the center of the air-conditioning device.

The figures show an air-conditioning device 10 in the form of a cross-sectional illustration. A fan (not shown), specifically a radial fan, which sucks in air perpendicular to the sectional plane, is arranged within the fan casing 11.

The air delivered by the radial fan first of all flows through the air filter 12 and then the evaporator 13, in which the air is cooled. The distributor space 14 adjoins the evaporator 13 in the downstream direction. In the regions in which a bypass passage 30 extends, a wall 31 of the bypass passage 30 closes off the first flow passage 15 apart from a slot 32 through which the mixing flap 33 is guided; it can be guided through in a fluid-tight manner in order to avoid leakage flows. In the regions next to the bypass passage, the first flow passage 15 leads directly into the mixing chamber 18.

The second flow passage 16 leads from the distributor space 14 via the heat exchanger 17 into the mixing chamber 18. The position of the switching flaps 34, which are shown in different positions, namely the two limit positions and an intermediate position, in the three figures, determines the ratio between the open cross section of flow from the first flow passage 15 to the second flow passage 16 and therefore the proportion of the volumetric flow coming from the evaporator 13 which is not routed via the heat exchanger 17. The temperature of the resulting mixed air in the mixing chamber 18 is controlled in this way.

A plurality of air exit passages 19 lead away from the mixing chamber 18, each of these passages being assigned a switching flap 20 which can be used to control the level of the air flow into the corresponding air exit passage 19. To achieve temperature stratification in the vehicle, the air exit passages 19 branch off at locations with a different mixing ratio between air from the first and second flow passages 15, 16, producing different temperatures of the mixed streams.

One of the air exit passages is what is known as the defrosting passage 21. This leads to the defrosting nozzles (schematically shown as 23 in FIG. 1a), which are arranged in the immediate vicinity of a window, in particular the front windshield of a vehicle (schematically shown as 25 in FIG. 1a), and is used to quickly heat up the window or remove fog caused by condensing water vapor from the window. In this case, the defrosting passage 21 branches off at a location which has a high proportion of air from the first flow passage and is therefore relatively cool. This impedes the heating and fog-avoidance function but is a structural requirement. Therefore, the bypass passage 30 is provided, which branches off in the second flow passage 16 and opens out in the defrosting passage 21 directly before the corresponding switching flap 20. As a result, an increased proportion of warm air is fed to the air stream in the defrosting passage 21. The volumetric flow through the defrosting passage 21 can be varied by means of the position of the mixing flap 33, since the free cross section of flow is dependent on the mixing flap position. The switching flap 20 assigned to the defrosting passage 21 controls the level of the volumetric flow through the defrosting passage 21 but not the proportion of the volumetric flow from the bypass passage 30 therein.

In the embodiment illustrated, the mixing flap 33 and the switching flap 34 are arranged on a common pivot axle 35, the flaps having curved surfaces 37 and being placed against the pivot axle 35 by way of pivot arms 36 which widen out in the radial direction. The pivot arms 36 have at least a partially closed side face, which performs a separating function between bypass passage 30 and first flow passage 15. Therefore, the position of the mixing flap 33 is directly coupled to the position of the switching flap 34, and the position of these flaps together can be altered by rotation of the pivot axle with respect to the housing by means of an actuator 38, as shown in FIGS. 1 to 3.

If, as shown in FIG. 1, the first flow passage 15 is closed, the entire air flow is passed via the heat exchanger 17, where it is heated. The bypass passage 30 is then open to its maximum extent and a high volumetric flow proportion of warm air is fed to the defrosting passage 21. This leads to a relatively high air temperature in the defrosting passage 21 and to the associated window or front windshield being heated as quickly as possible, leading to a window which is free of fog and ice.

Figure 3A:
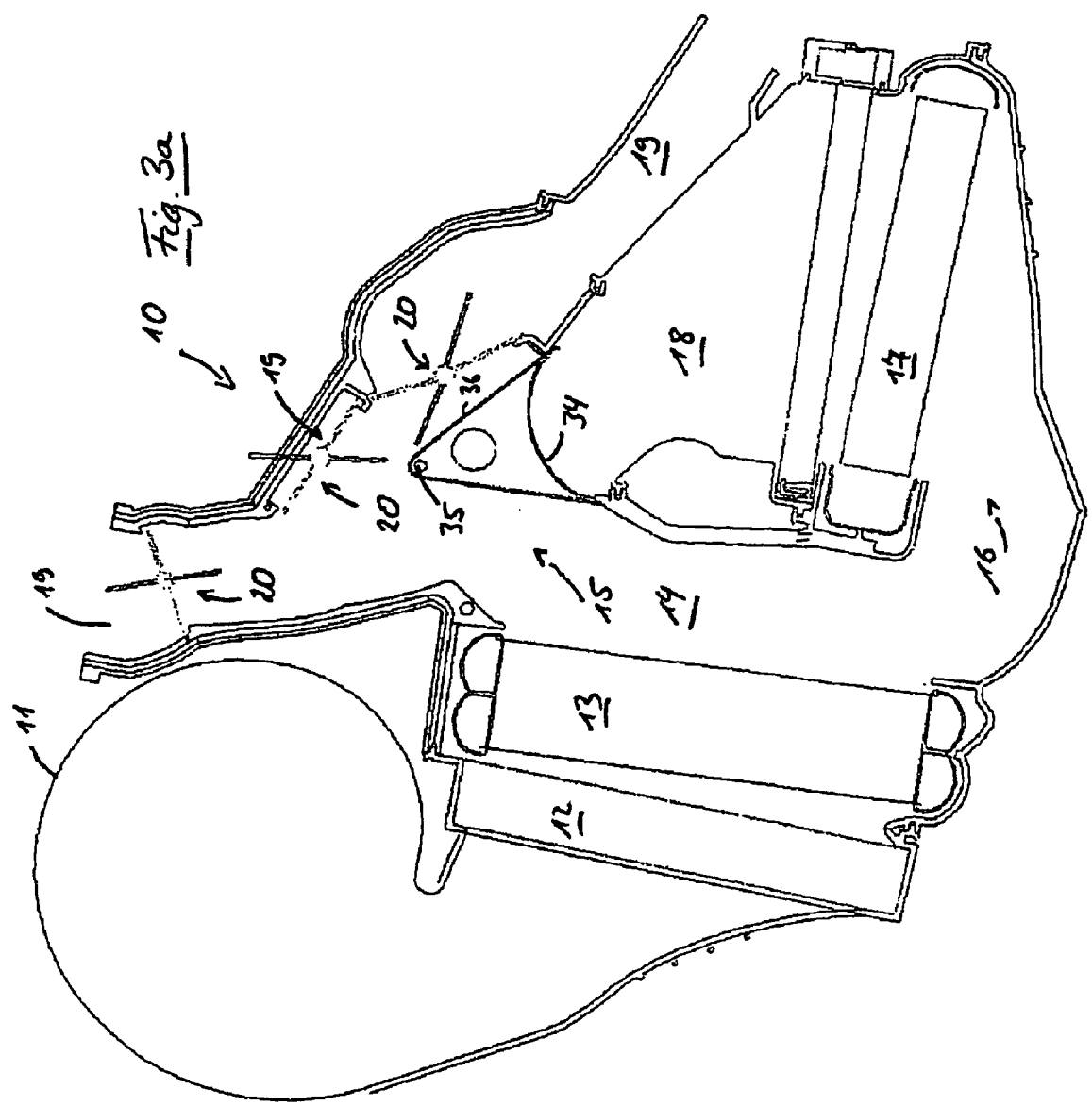

If, as shown in FIG. 3, the first flow passage 15 is open, the entire air flow is passed via the first flow passage 15, and therefore bypasses the heat exchanger 17. The bypass passage 30 is then closed, and no warmed air from the bypass passage 30 is fed to the defrosting passage 21. This leads to a relatively low air temperature in the defrosting passage 21, and rapid cooling of the interior and the generation of a favorable air stratification in the vehicle interior are promoted.

In the intermediate position illustrated in FIG. 2, in each case partial streams are generated. Therefore, a small volumetric flow of warm air is passed via the bypass passage 30 to the defrosting passage 21, although the latter is still at an elevated temperature compared to the air which otherwise flows through it, but not to the same extent as with free flow through the bypass passage. As a result, warmed air is supplied in the region of the window associated with the defrosting passage 21, but this warmed air does not unnecessarily disrupt the temperature stratification in the vehicle. The degree of heating is influenced by the extent of the desired temperature change, which determines the position of the switching flap 34.

Figure 4:
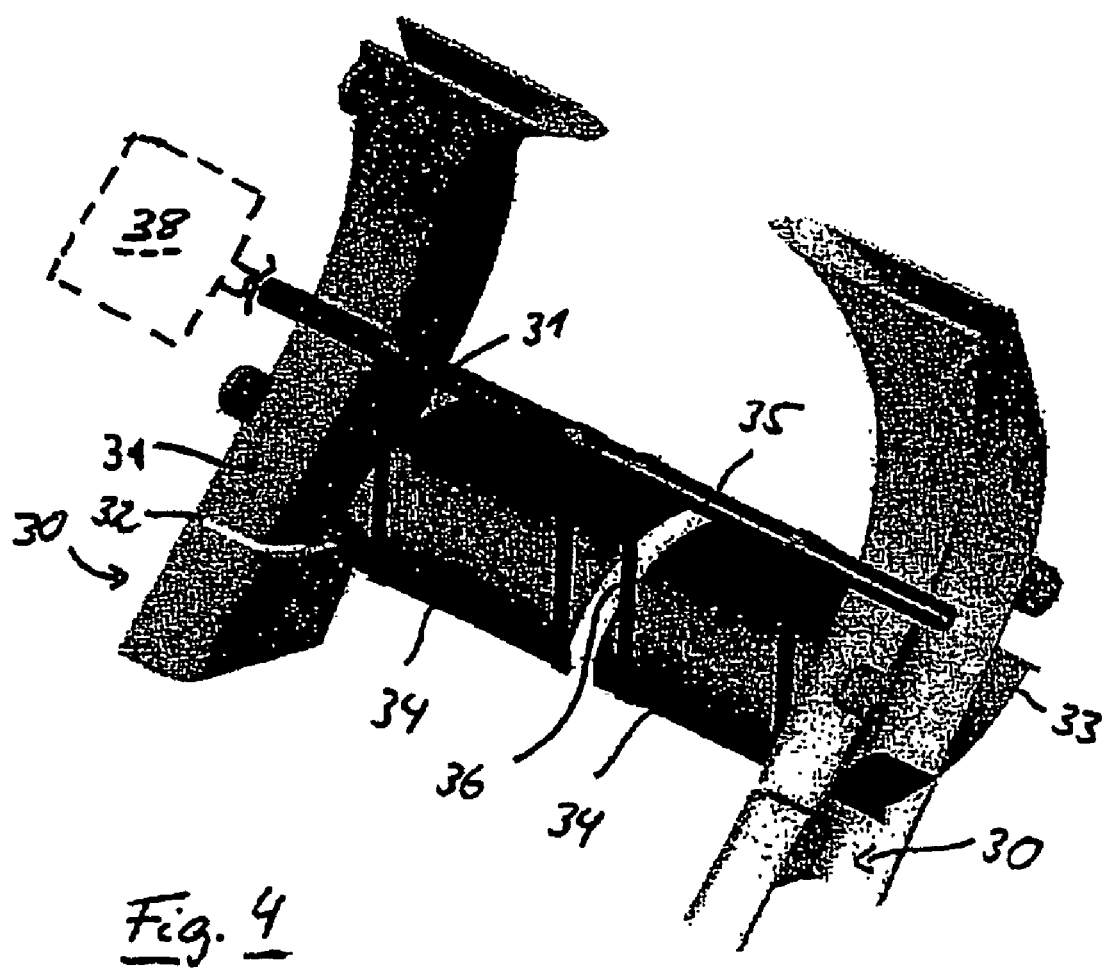
FIG. 4 shows a diagrammatic perspective illustration of a flap element which comprises both a mixing flap and a control flap, as well as the associated bypass passages.

FIG. 4 shows a perspective illustration of a flap element which combines mixing flap 33 and switching flap 34. In this case, the mixing flap segment 33 is curved convexly, while the switching flap segment 34 is curved concavely. The elliptical lens between switching flap segment 34 and mixing flap segment 33 forms a wall 31 which is also responsible for the fluidic separation between the bypass passage 30 and the first flow passage 15 in this region, in which the slot 31 in the bypass passage 30 is also present. This wall may also be part of a pivot arm 36 which widens radially outward. In the embodiment illustrated, however, the pivot arms 36 are designed as webs formed separately. FIG. 4 shows two laterally arranged bypass passages 31 which each have a mixing flap 33, with the first flow passage 16, which can be closed by means of two switching flaps 34 arranged therein, extending between them. The actuator 38 which is responsible for generating the actuating movement of the flaps is indicated in dashed lines in this figure. The actuator 38 is in this case controlled by a suitable control unit which is also used to carry out methods according to the invention.

The invention claimed is:

1. An air-conditioning device for a vehicle, comprising:
a fan for generating a given air stream;
an evaporator arranged downstream of the fan and through which the given air stream flows;
a distributor space arranged after the evaporator;
control flaps between a first flow passage and a second flow passage, wherein the given air stream is configured to be divided by the control flaps such that generation of a first partial air stream and a second partial air stream is possible;
a mixing chamber, wherein the first flow passage opens out into the mixing chamber;
a heat exchanger arranged in the second flow passage for heating the second partial air stream, wherein the second flow passage opens out in the mixing chamber downstream of the heat exchanger, wherein generation of a mixed air stream from the first and second partial air streams in the mixing chamber is possible, wherein the control flaps are configured to divide the first partial air stream into first and second portions in which one of the first and second portions of the first partial air stream is directed to hotter air comprising the second partial air stream in the mixing chamber;
air exit passages leading from the mixing chamber into different regions of the vehicle's interior, wherein each air exit passage is assigned with a switching flap on a mixing chamber side for controlling an air exit stream from the mixing chamber through the associated air exit passage, wherein at least one of the air exit passages is a defrosting passage used to generate a defrost air stream directly on an inner side of a vehicle window and opens out at a defrosting nozzle assigned to the vehicle window;

at least one bypass passage through which a warm air stream can flow, wherein the at least one bypass passage branches off downstream of the heat exchanger, starting from the second flow passage upstream of the mixing chamber, and opens out directly into the defrosting passage; and a mixing flap assigned to the at least one bypass passage for controlling the warm air stream through the bypass passage, wherein the mixing flap and control flaps are arranged axially on a common pivot axle, wherein the mixing flap extends within regions in which the at least one bypass passage runs and the control flaps are formed in regions other than the at least one bypass passage, and wherein the mixing flap associated with the bypass passage is curved convexly in cross section and the control flaps are curved concavely in cross section.

2. The air-conditioning device as claimed in claim 1, wherein the mixing flap is coupled to the control flaps.

3. The air-conditioning device as claimed in claim 1, wherein the mixing flap and control flaps are driven by a common actuator.

4. The air-conditioning device as claimed in claim 1, wherein the first flow passage is designed as an overflow passage with respect to the second flow passage, within the course of which the control flaps are arranged, and wherein a ratio between the first partial air stream and the second partial air stream is defined by the control flaps arranged in a region of a beginning of the first and second flow passages.

5. The air-conditioning device as claimed in claim 4, wherein the bypass passage runs such that the bypass passage passes through the first flow passage, and wherein the first flow passage has the bypass passage passing through it in a region of the control flaps.

6. The air-conditioning device as claimed in claim 1, wherein the mixing and control flaps are articulatively mounted on the common pivot axle by pivot arms which widen out in a shape of a segment of a circle and are also arranged at an edge.

7. A method for operating an air-conditioning device of a vehicle, comprising:

providing an air-conditioning device, wherein the air conditioning device comprises:

a fan for generating a given air stream;

an evaporator arranged downstream of the fan and through which the given air stream flows;

a distributor space arranged after the evaporator;

control flaps between a first flow passage and a second flow passage, wherein the given air stream is configured to be divided by the control flaps such that generation of a first partial air stream and a second partial air stream is possible;

a mixing chamber, wherein the first flow passage opens out into the mixing chamber;

a heat exchanger arranged in the second flow passage for heating the second partial air stream, wherein the second flow passage opens out in the mixing chamber downstream of the heat exchanger, wherein generation of a mixed air stream from the first and second partial air streams in the mixing chamber is possible, wherein the control flaps are configured to divide the first partial air stream into first and second portions in which one of the first and second portions of the first partial air stream is directed to hotter air comprising the second partial air stream in the mixing chamber;

air exit passages leading from the mixing chamber into different regions of the vehicle's interior, wherein each air exit passage is assigned with a switching flap on a mixing chamber side for controlling an air exit stream from the mixing chamber through the associated air exit passage, wherein at least one of the air exit passages is a defrosting passage used to generate a defrost air stream directly on an inner side of a vehicle window and opens out at a defrosting nozzle assigned to the vehicle window;

at least one bypass passage through which a warm air stream can flow, wherein the at least one bypass passage branches off downstream of the heat exchanger, starting from the second flow passage upstream of the mixing chamber, and opens out directly into the defrosting passage; and a mixing flap assigned to the at least one bypass passage for controlling the warm air stream through the bypass passage, wherein the mixing flap and control flaps are arranged axially on a common pivot axle, wherein the mixing flap extends within regions in which the at least one bypass passage runs and the control flaps are formed in regions other than the at least one bypass passage, and wherein the mixing flap associated with the bypass passage is curved convexly in cross section and the control flaps are curved concavely in cross section; and controlling the mixing flap to control the warm air stream which flows into the bypass passage.

8. The method as claimed in claim 7, wherein the mixing flap of the bypass passage is mechanically coupled to the control flaps which divide the first and second partial air streams.

9. The method as claimed in claim 8, wherein actuating movement of the mixing flap is partially effected by an actuator of the control flaps.

10. An air-conditioning device for a vehicle, comprising:

a fan for generating a given air stream;

an evaporator positioned downstream of the fan and through which the given air stream flows;

a distributor space positioned downstream of the evaporator;

control flaps between a first flow passage and a second flow passage, wherein the given air stream is configured to be divided by the control flaps such that generation of a first partial air stream and a second partial air stream is possible, a mixing chamber, wherein the first flow passage leads into the mixing chamber;

a heat exchanger positioned in the second flow passage for heating the second partial air stream, wherein the second flow passage opens out in the mixing chamber downstream of the heat exchanger, wherein generation of a mixed air stream from the first and second partial air streams in the mixing chamber is possible;

air exit passages leading from the mixing chamber into different regions of the vehicle's interior, wherein each air exit passage is assigned with a switching flap on a mixing chamber side for directing an air exit stream from the mixing chamber through the associated air exit passage, wherein at least one of the air exit passages is a defrosting passage used to generate a defrost air stream directly on an inner side of a vehicle window and emerges at a defrosting nozzle assigned to the vehicle window;

at least one bypass passage through which a warm air stream can flow, wherein the at least one bypass passage branches off downstream of the heat exchanger, starting from the second flow passage upstream of the mixing chamber, and leads directly into the defrosting passage; and a mixing flap assigned to the at least one bypass passage for directing the warm air stream through the bypass passage, wherein the mixing flap and control flaps are arranged axially on a common pivot axle, wherein the mixing flap is axially spaced apart from the control flaps in relation to the common pivot axle and the mixing flap and control flaps are curved in cross section, wherein the mixing flap extends into regions in which the at least one bypass passage runs and the control flaps are formed in regions other than the at least one bypass passage, and wherein the mixing flap associated with the bypass passage has a convexly curved surface radially disposed from the common pivot axle and the control flaps which serve to divide the given air stream into the first and second partial air streams have a concavely curved surface radically disposed from the common pivot axle.

11. The air-conditioning device as claimed in claim 10, wherein the position of the mixing flap is linked to the positions of the control flaps.

12. The air-conditioning device as claimed in claim 10, wherein the mixing flap and control flaps are driven by a common actuator.

13. The air-conditioning device as claimed in claim 10, wherein the first flow passage is designed as an overflow passage with respect to the second flow passage, within the course of which the control flaps are arranged, and wherein a ratio between the first partial air stream and the second partial air stream is defined by the control flaps arranged in a region of a beginning of the first and second flow passages.

14. The air-conditioning device as claimed in claim 13, wherein the bypass passage runs such that the bypass passage passes through the first flow passage, and wherein the first flow passage has the bypass passage passing through it in a region of the control flaps.

15. The air-conditioning device as claimed in claim 10, wherein the mixing and control flaps are articulatively mounted on the common pivot axle by pivot arms which widen out in a shape of a segment of a circle and are also arranged at an edge.

16. A method for operating an air-conditioning device of a vehicle, comprising:

providing the air-conditioning device comprising: a fan for generating a given air stream;

an evaporator positioned downstream of the fan and through which the given air stream flows;

a distributor space positioned downstream of the evaporator; control flaps between a first flow passage and a second flow passage, wherein the given air stream is configured to be divided by the control flaps such that generation of a first partial air stream and a second partial air stream is possible, a mixing chamber, wherein the first flow passage leads into the mixing chamber;

a heat exchanger positioned in the second flow passage for heating the second partial air stream, wherein the second flow passage opens out in the mixing chamber downstream of the heat exchanger, wherein generation of a mixed air stream from the first and second partial air streams in the mixing chamber is possible;

air exit passages leading from the mixing chamber into different regions of the vehicle's interior, wherein each air exit passage is assigned with a switching flap on a mixing chamber side for directing an air exit stream from the mixing chamber through the associated air exit passage, wherein at least one of the air exit passages is a defrosting passage used to generate a defrost air stream directly on an inner side of a vehicle window and emerges at a defrosting nozzle assigned to the vehicle window;

at least one bypass passage through which a warm air stream can flow, wherein the at least one bypass passage branches off downstream of the heat exchanger, starting from the second flow passage upstream of the mixing chamber, and leads directly into the defrosting passage; and a mixing flap assigned to the at least one bypass passage for directing the warm air stream through the bypass passage, wherein the mixing flap and control flaps are arranged axially on a common pivot axle, wherein the mixing flap is axially spaced apart from the control flaps in relation to the common pivot axle and the mixing flap and control flaps are curved in cross section, wherein the mixing flap extends into regions in which the at least one bypass passage runs and the control flaps are formed in regions other than the at least one bypass passage, and wherein the mixing flap associated with the bypass passage has a convexly curved surface radially disposed from the common pivot axle, and the control flaps which serve to divide the given air stream into the first and second partial air streams have a concavely curved surface radially disposed from the common pivot axle; and controlling the mixing flap to control the warm air stream which flows into the bypass passage.

17. The method as claimed in claim 16, wherein the mixing flap of the bypass passage is mechanically linked to the control flaps which divide the first and second partial air streams.

18. The method as claimed in claim 17, wherein actuating movement of the mixing flap is effected by an actuator of the control flaps.

* * * * *